The specifications and drawings are not for print.
6520X
J. S. West.
Thrashing Mach.
Patented Apr. 26, 1831.
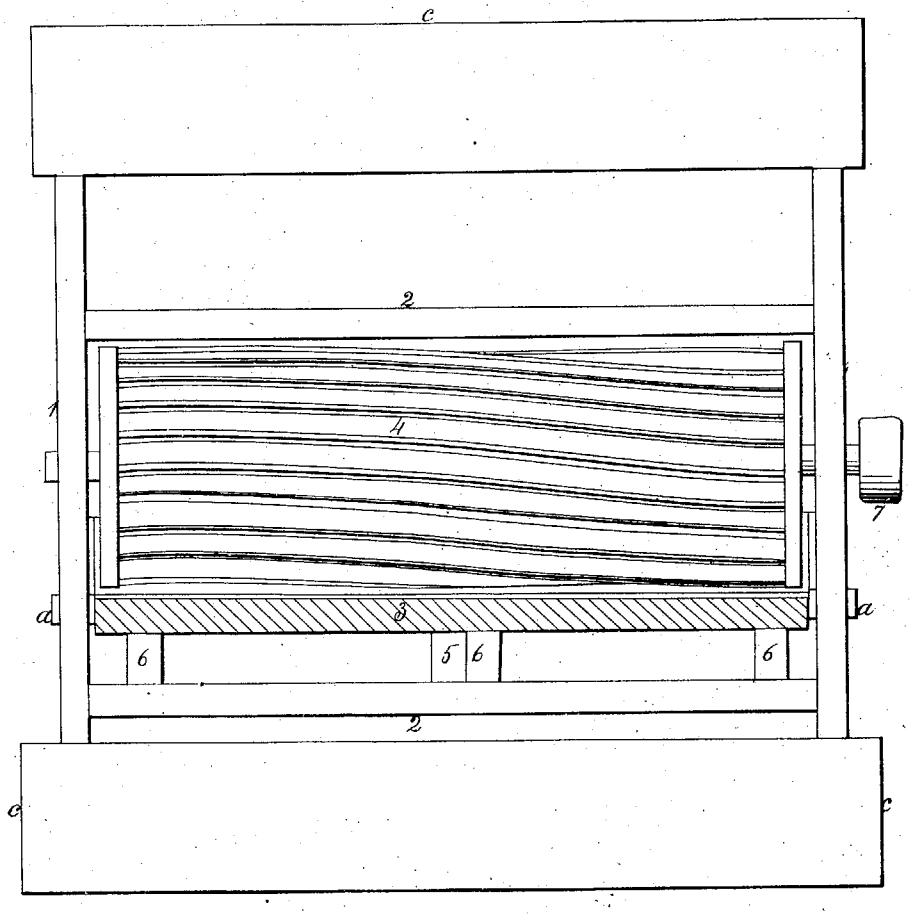
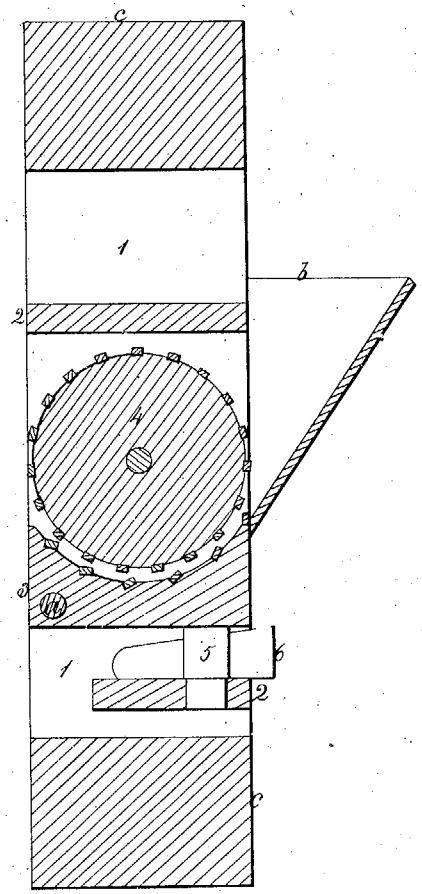
THE NORRIS PETERS CO., WASHINGTON, D. C.

April 26 1831 6520X 487

Joshua S. West of Portland State of New York,

Letters Patent,

The schedule referred to in these Letters Patent and making part of the same containing a description in the words of the said Joshua S. West, himself of his improvement in the threshing Machine, ——

To all to whom these presents shall come,

Be it known that I, Joshua S. West of Portland, County of Chatauque and State of New York, having invented a new and useful improvement in the operation of thrashing english and other grain, by means of a Machine which may also be applied to other purposes, viz. the grinding of Apples and mashing of indian corn, and that the following is a full and exact description of the construction and operation of the said Machine as invented or improved by me. — —

Fig. 1. 1. on the draft of the machine herewith accompanying represents two planks or pieces of timber standing perpendicularly two or more inches thick by fourteen or more inches wide secured at each end by being tenoned into stationary square sticks of timber and the planks may stand four feet apart, or more or less.

Fig. 2. 2 Represents two pieces of plank corresponding in thickness — with the above mentioned perpendicular planks, or timber, the upper piece may be fourteen or more inches wide, and the lower piece six or more inches wide and both secured at each end by being tenoned to the perpendicular planks Fig. 1. 1. Fig. 3. Represents a piece of timber having a concavity on the upper side corresponding with the shape and size of the cylinder Fig. 4. in which concave six or more bars of iron are imbedded longitudinally one corner of each bar being sunk the thickness of the bar which leaves one side and one edge of each bar exposed to view when not covered by the cylinder as is partly represented in this figure. The bars may be three eighths of an inch thick or more, and one and one eighth inch wide or more.

Fig. 4. Represents a wooden cylinder fourteen or more inches in diameter, at one end and thirteen and a half or more inches in diameter at the other end, and gradually and regularly tapering from A. to B. the two [illegible]

6520X of the cylinder and small bars of iron run spirally lengthwise of the cylinder — and are partly sunk in the cylinder by means of grooves formed in it and the bars of iron are secured by two or more bands of iron c,c,c,c,c, running around the cylinder, The iron bars may be similar in width and thickness to those imbedded in the concave fig. 3.

Fig 5. Is a small block tenoned through the lower horizontal plank Fig 2, and supports the concave Fig, 3, at its centre near the front edge and as the concave is secured at each end to the plank Fig 1.1, or by a round tenon near the back side, it rolls a little when it is hard crowded by means of sticks or other hard substances which may — accidentally pass through. When such is the case the lower horizontal plank, is pushed down and consequently acts as a spring Fig 6.6.6, are three keys of wood by means of which the concave Fig.3. may be raised or lowered and consequently so graduated as to be suited to the various purposes for which it is intended Fig. 7. Represents a whirl fixed on the extremity of the gudgeon at the largest end of the cylinder which connects the machine by means of a belt with the power that propels it. It is intended that the iron or steel gudgeon which support the cylinder fig, 4, at each end should play in Friction Rollers fixed in the plank Fig, 1.1. to facilitate motion of the cylinder To the machine is added a hopper or feeder which receives english grain in loose bunches, the heads of the grain at the largest extremity of the cylinder, and the butts of the straw at the smallest extremity, As the cylinder is tapering and the bars of iron on it run spirally, the straw passes through quartering, in consequence of which the machine clears itself light and easy and does not become choked as is the case with machines where the straw passes through endwise.

Witnesses
Abiel Silver
Benj.ⁿ F. Silver

Joshua S. West 728 n.b.

Ent.
Ch.W.